3,402,178
PROCESS FOR THE PREPARATION OF
HETEROCYCLIC IMINOETHERS
Alan J. Levy and Morton H. Litt, Morristown, N.J., assignors to Allied Chemical Corporation, New York, N.Y., a corporation of New York
No Drawing. Filed Nov. 17, 1966, Ser. No. 595,040
6 Claims. (Cl. 260—307)

This invention relates to a novel process for the preparation of heterocyclic iminoethers and more particularly, to a process for the preparation of heterocyclic iminoethers by the reaction of an organic trihalide with an aminoalkanol in the presence of a base.

Heterocyclic iminoethers, particularly 2-substituted-2-oxazolines and 2-oxazines are useful as solvents, plasticizers, and the like, and additionally they may be polymerized to afford polymers of a wide range of molecular weights which are suitable for use in coatings, films, fibers, and paints, as well as many other known polymer applications.

Heterocyclic iminoethers have hitherto been prepared by several methods, but none is completely satisfactory. Thermally induced cyclodehydration of N($\beta$-hydroxyethyl) amides affords 2-alkyl-substituted-2-oxazolines such as 2-methyl-2-oxazoline and 2-ethyl-2-oxazoline, but attempts to prepare 2-aryl-substituted-2-oxazolines such as 2-phenyl-2-oxazoline by this method were unsuccessful. Use of a condensing agent such as phosphorus pentoxide enables one to prepare 2-phenyl-2-oxazoline by this method but only in very low yield.

Oxazines and oxazolines can also be prepared by cyclodehydration of N-($\beta$ or $\gamma$-hydroxyalkyl) amides by passing the amides in vaporous form over a heated catalyst such as silica, alumina, silica-alumina, or magnesious silica in accordance with the method disclosed in copending application U.S. Ser. No. 382,342 filed July 13, 1964. This method, although efficient, requires high temperatures of reaction—on the order of 200° to 400° C., which adds greatly to the cost of this process.

Thus, a simple and inexpensive process for the preparation of heterocyclic iminoethers which utilizes readily available starting materials and moderate reaction temperatures is highly desirable.

It is an object of this invention to provide a novel convenient process for the preparation of heterocyclic iminoethers.

It is another object of this invention to provide a process for the preparation of heterocyclic iminoethers at moderate temperatures.

Further objects and advantages will become apparent from the description of the invention which follows in greater detail.

These and other objects are accomplished according to our invention wherein heterocyclic iminoethers having the formula

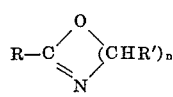

wherein R represents a radical selected from the group comprising hydrogen and aliphatic and aromatic hydrocarbons, which hydrocarbons may contain inert substituents such as nitro and halogen groups, R' at each occurrence is independently selected from the group consisting of hydrogen and lower alkyl radicals, and $n$ is an integer from 2 to 3 are prepared by reacting an aminoalkanol having the formula $NH_2(CHR')_nOH$, wherein R' and $n$ have the meanings given above with an organic trihalide of the formula R—$CX_3$, wherein R has the meaning given above and X represents chlorine or bromine, in solution at a temperature of from about 80° C. to about 150° C. in the presence of a base, particularly, an inorganic carbonate. Lower alkyl as hereinabove used connotes aliphatic radicals having from 1 to about 6 carbon atoms.

Illustrative organic trihalides suitable for use in this invention are chloroform, bromoform, 1,1,1-trichloroethane and substituted 1,1,1-trichloroethanes, benzotrichloride, p-methylbenzotrichloride, p-nitrobenzotrichloride, 1,3,4-trichlorobenzotrichloride, and the like.

Suitable aminoalkanols include ethanol amine, 3-amino propanol, 2-amino-1-butanol, 1-amino-2-propanol, 2-amino-3-hydroxy butane, and the like.

The reaction may be carried out in any inert solvent, which is a solvent for at least one of the reactants. Suitable solvents include pyrrolidone and N-alkyl-substituted pyrrolidones such as N-methyl pyrrolidone, N-ethyl pyrrolidone and N-isobutyl pyrrolidone, diglyme, diethylcarbitol, xylene, cumene, and the like. In the preferred embodiment of our invention, the solvent has a boiling point of at least 125° C. and is water miscible.

The base reacts with the hydrogen halide produced during the course of the reaction, which proceeds according to the following equation:

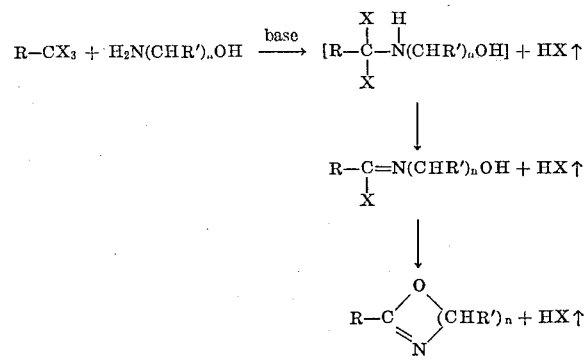

It is apparent that 3 mols of base is required per mol of trihalide reacted for complete neutralization of the hydrogen halide reaction side product. An excess of base may be present, although this is not necessary for complete reaction. Suitable bases include the alkali metal carbonates and hydroxides such as sodium carbonate and potassium carbonate; the alkaline earth metal carbonates, oxides, and hydroxides such as calcium carbonate, ammonium carbonate, and the like.

The desired heterocyclic iminoether product may be recovered from the reaction mixture in any convenient manner such as will be known to one skilled in the art. One method is to remove the inorganic salts from the reaction mixture by filtration, wash the filtrate with water to remove any solvent and unreacted water-soluble aminoalkanol starting material, and decant the water layer from the organic layer which will contain the desired product and any unreacted organic trihalide. The heterocyclic iminoether product may be separated from unreacted trihalide by transforming the iminoether into its water-soluble sulfate salt by washing the iminoether-trihalide mixture with dilute aqueous sulfuric acid, decanting the aqueous layer which will contain the iminoether in the form of its sulfate salt, and then regenerating the free iminoether by neutralizing the aqueous layer with a base. The heterocyclic iminoether product can be isolated by extracting it from the neutralized aqueous layer with a water imiscible organic solvent and evaporating off the solvent.

The invention can be further illustrated by the examples given below.

Example 1

30.5 grams (0.5 mol) of ethanolamine is dissolved in 155 ml. of 2-pyrrolidone and 159 grams (1.5 mol) of anhydrous sodium carbonate is then added. 98.0 grams (0.5 mol) of freshly distilled benzotrichloride is added slowly and the mixture stirred while heating up to about 140° C. over a two-hour period. The dark brown reaction mixture is then cooled to room temperature and the solid inorganic precipitate removed by filtration. The filtrate is taken up in ether and the ethereal solution washed with water to remove the solvent and any unreacted ethanolamine. The ethereal solution is then added to 300 ml. of water containing 98 grams (1.0 mol) of concentrated sulfuric acid chilled to 0° C. The ether layer, which contains any unreacted benzotrichloride, is decanted. The aqueous layer is then poured into cold 20% aqueous sodium hydroxide solution which is then extracted with ether.

After evaporating off the ether, a residue consisting of 13.6 grams of phenyl-2-oxazoline is obtained as an orange liquid. Distillation under reduced pressure affords 9.6 grams (13 wt. percent yield) of 2-phenyl-2-oxazoline as a colorless liquid; boiling point 66° C./0.5 mm., index of refraction $n_D^{24°\text{ C.}}$ 1.5651. (Reported: 69° C./0.1 mm., $n_D^{25°\text{ C.}}$ 1.5655.)

Example 2

A mixture of 159 grams (1.5 mols) of anhydrous sodium carbonate, 30.5 grams (0.5 mol) of ethanolamine, 177.3 grams (0.50 mol) of 1,1,1-trichloro-2,2-bis-(p-chlorophenyl) ethane and 155 cc. of diglyme is heated slowly to 140° and allowed to cool. The mixture is filtered and the solid collected by filtration washed several times with ether. The filtrate and ether washings are combined and washed with water. The ethereal solution is then extracted with chilled dilute sulfuric acid and the acid washings immediately poured onto iced excess 20% aqueous sodium hydroxide solution. The NaOH solution is extracted with ether and the ethereal solution dried. Evaporating off the ether affords crude 2-[2,2-bis-(p-chlorophenyl)]methyl-2-oxazoline.

Example 3

A mixture of 159 grams (1.5 mols) of anhydrous Na$_2$CO$_3$, 30.5 grams (0.5 mol) of ethanolamine 66.75 grams (0.50 mol) of 1,1,1-trichloroethane and 155 mols of N-methyl-2-pyrrolidone is refluxed for 12 hours. It is allowed to cool to room temperature and filtered. The solid precipitate, which is recovered by filtration, is washed several times with ether. The filtrate and ether washings are combined, washed with water, dried, and all solvent distilled off under reduced pressure. The residue is then distilled affording 2-methyl-2-oxazoline, B.P. 110°/760 mm.

Example 4

A mixture of 37.5 grams (0.5 mol) of 3-aminopropanol, 159 grams (1.5 mol) of sodium carbonate and 200 ml. of 2-pyrrolidone is heated to 145° C. 98.0 grams (0.5 mol) of freshly distilled benzotrichloride is added dropwise to the stirred, heated mixture. After addition is complete, stirring is continued for an additional 2 hours. The reaction mixture is then cooled to room temperature, filtered, and diluted with ether. The ethereal solution is then washed with water and extracted with dilute aqueous sulfuric acid. The sulfuric acid extract is neutralized with caustic and back extracted with ether. The ether extracts are combined, dried over magnesium sulfate, and stripped affording a viscous brown oil. Distillation of this oil under reduced pressure affords a 37% yield of 2-phenyl-5,6-dihydro-1,3,4-oxazine, B.P. 85° C./0.4 mm. (Reported 80°–81° C./0.2 mm.)

Various modifications will be apparent to one skilled in the art and it is not intended that this invention be limited to the details in the specific examples presented by way of illustration. Accordingly, the scope of the invention is limited only by the appended claims.

We claim:
1. A process for the preparation of heterocyclic iminoethers having the formula

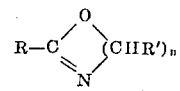

wherein R represents a radical selected from the group comprising hydrogen, aliphatic and aromatic hydrocarbons which may contain inert substituents, R' at each occurrence is a member independently selected from the group consisting of hydrogen and lower alkyl radicals, and $n$ is an integer from 2 to 3, which comprises reacting an aminoalkanol of the formula NH$_2$(CHR')$_n$OH, wherein R' and $n$ have the meanings given above, with an organic trihalide of the formula R—CX$_3$, wherein R has the meaning given above, and X is chlorine or bromine, in solution at a temperature from about 80° C. to about 150° C. in the presence of an inorganic base.

2. A process according to claim 1 wherein the aminoalkanol is ethanol amine.

3. A process according to claim 1 wherein R is phenyl.

4. A process according to claim 1 wherein the aminoalkanol is ethanol amine and the organic trihalide is benzotrichloride.

5. A process according to claim 1 wherein said aminoalkanol and organic trihalide are dissolved in a solvent selected from the group comprising pyrrolidone and N-alkyl-pyrrolidones.

6. A process according to claim 1 wherein said inorganic base is an alkali metal carbonate and is present in a molar ratio to said organic trihalide of at least about 3:1.

References Cited
UNITED STATES PATENTS 2,329,619  9/1943  Jayne et al. _____ 260—244

HENRY R. JILES, *Primary Examiner.*

R. BOND, *Assistant Examiner.*